US011682988B2

(12) United States Patent
Zheng et al.

(10) Patent No.: US 11,682,988 B2
(45) Date of Patent: Jun. 20, 2023

(54) METHOD FOR CONTROLLING AN ELECTRIC MOTOR

(71) Applicant: Dyson Technology Limited, Wiltshire (GB)

(72) Inventors: Libo Zheng, Swindon (GB); Min Zhang, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 0 days.

(21) Appl. No.: 17/685,258

(22) Filed: Mar. 2, 2022

(65) Prior Publication Data

US 2022/0190751 A1 Jun. 16, 2022

Related U.S. Application Data

(62) Division of application No. 15/496,518, filed on Apr. 25, 2017, now Pat. No. 11,296,621.

(30) Foreign Application Priority Data

Apr. 26, 2016 (GB) ...................................... 1607286

(51) Int. Cl.
*H02P 1/46* (2006.01)
*H02P 3/14* (2006.01)
*H02P 1/02* (2006.01)
(52) U.S. Cl.
CPC ................ *H02P 1/46* (2013.01); *H02P 1/029* (2013.01); *H02P 3/14* (2013.01)
(58) Field of Classification Search
USPC .................................................... 318/400.01
See application file for complete search history.

(56) References Cited

U.S. PATENT DOCUMENTS

| 8,274,249 B2 | 9/2012 | Mishima |
| 8,552,669 B2 | 10/2013 | Kusakawa |
| 8,587,238 B2 | 11/2013 | Maiocchi |
| 2002/0117992 A1 | 8/2002 | Hirono et al. |

(Continued)

FOREIGN PATENT DOCUMENTS

| CN | 1574606 A | 2/2005 |
| CN | 1787360 A | 6/2006 |

(Continued)

OTHER PUBLICATIONS

Invitation to Pay Additional Fees dated Jul. 28, 2017, directed to PCT Application No. PCT/GB2017/050903; 12 pages.

(Continued)

*Primary Examiner* — Jorge L Carrasquillo
(74) *Attorney, Agent, or Firm* — Faegre Drinker Biddle & Reath LLP

(57) ABSTRACT

A method is described for controlling an electric motor having a rotor. The method is carried out after a shutdown of the motor has been initiated. The method includes starting a timer in a motor controller, performing regenerative braking to recapture kinetic energy from the rotor as electrical energy, and using the recaptured electrical energy from the regenerative braking to power the motor controller. If the timer in the motor controller exceeds a predetermined timer value, a flag is set in memory in the motor controller to indicate that the motor has stopped.

7 Claims, 6 Drawing Sheets

(56) References Cited

U.S. PATENT DOCUMENTS

| | | |
|---|---|---|
| 2004/0118638 A1 | 6/2004 | Delaporte |
| 2004/0232874 A1 | 11/2004 | Fukamizu et al. |
| 2006/0119311 A1 | 6/2006 | Lee |
| 2007/0126381 A1 | 6/2007 | Wei et al. |
| 2008/0218115 A1 | 9/2008 | Hamabata et al. |
| 2009/0079369 A1 | 3/2009 | Kunimitsu |
| 2009/0237016 A1 | 9/2009 | Iwashita et al. |
| 2010/0229532 A1 | 9/2010 | Ohno |
| 2010/0284673 A1 | 11/2010 | Aoki et al. |
| 2010/0308764 A1 | 12/2010 | Suzuki et al. |
| 2011/0066331 A1* | 3/2011 | Yamashita ........... B62D 5/0481 701/42 |
| 2011/0279975 A1* | 11/2011 | Shimizu ................ H02P 6/17 377/16 |
| 2012/0019176 A1 | 1/2012 | Okamura |
| 2012/0091929 A1 | 4/2012 | Kusakawa |
| 2012/0304622 A1 | 12/2012 | Verbrugge et al. |
| 2013/0293167 A1 | 11/2013 | Harris et al. |
| 2014/0078610 A1 | 3/2014 | Otaguro |
| 2014/0300300 A1 | 10/2014 | Winker et al. |
| 2015/0097510 A1* | 4/2015 | Katayama ................ H02P 6/24 318/721 |
| 2015/0178997 A1* | 6/2015 | Ohsaki ................... G07C 5/00 701/29.1 |
| 2017/0163181 A1 | 6/2017 | Namuduri et al. |
| 2017/0310249 A1 | 10/2017 | Zheng et al. |

FOREIGN PATENT DOCUMENTS

| | | |
|---|---|---|
| CN | 101192802 A | 6/2008 |
| CN | 101261510 A | 9/2008 |
| CN | 101432960 A | 5/2009 |
| CN | 101867337 A | 10/2010 |
| CN | 102447435 A | 5/2012 |
| CN | 103701397 A | 4/2014 |
| CN | 103825502 A | 5/2014 |
| CN | 104365007 A | 2/2015 |
| DE | 102012102869 A1 | 10/2013 |
| EP | 1479800 A2 | 11/2004 |
| EP | 2394837 A1 | 12/2011 |
| EP | 2442439 A2 | 4/2012 |
| EP | 2538285 A1 | 12/2012 |
| GB | 2430317 A | 3/2007 |
| GB | 2501370 A | 10/2013 |
| JP | 62-163585 A | 7/1987 |
| JP | 62-268372 A | 11/1987 |
| JP | 01-209972 A | 8/1989 |
| JP | 07-170782 A | 7/1995 |
| JP | 08-266088 A | 10/1996 |
| JP | 10-313586 A | 11/1998 |
| JP | 11-113285 A | 4/1999 |
| JP | 2001-078484 A | 3/2001 |
| JP | 2003-047277 A | 2/2003 |
| JP | 2004-040837 A | 2/2004 |
| JP | 2004-297993 A | 10/2004 |
| JP | 2005-186187 A | 7/2005 |
| JP | 2006-166586 A | 6/2006 |
| JP | 2015-198463 A | 11/2015 |

OTHER PUBLICATIONS

Notification of Reason for Rejection dated May 25, 2020, directed to JP Application No. 2019-127314; 5 pages.

Office Action dated Jul. 9, 2018, directed to Japanese Application No. 2017-087288; 12 pages.

Search Report dated Jul. 27, 2018, directed to GB Application No. 1806156.4; 1 Page.

Search Report dated Jul. 27, 2018, directed to GB Application No. 1806157.2; 1 Page.

Search Report dated Oct. 26, 2016, directed to GB Application No. 1607286.0; 1 page.

The First Office Action dated May 8, 2019, directed to CN Application No. 201710281929.X; 27 pages.

The Second Office Action dated Apr. 2, 2020, directed to CN Application No. 201710281929.X; 25 pages.

\* cited by examiner

METHOD FOR CONTROLLING AN ELECTRIC MOTOR

REFERENCE TO RELATED APPLICATIONS

This application is a divisional application of prior U.S. patent application Ser. No. 15/496,518, filed Apr. 25, 2017, which claims the priority of United Kingdom Application No. 1607286.0, filed Apr. 26, 2016, all of which are incorporated herein by reference in their entirety.

FIELD OF THE INVENTION

The present invention relates to a method for controlling an electric motor.

BACKGROUND OF THE INVENTION

When a motor is switched off, it can often take some time before the rotor stops spinning. In a permanent magnet brushless electric motor, as the rotor reaches the point where it becomes stationary, the attraction/interaction of the magnetic poles in the rotor with the poles of the stator, known as cogging torque, causes the rotor to rotationally oscillate prior to coming to a complete stop. This is sometimes referred to as a jitter phase. The jitter phase will usually last for a set period of time that may be dependent on a number of factors, for example the strength of the magnet, and the proximity of the stator poles to the rotor.

Problems can arise if it is attempted to restart the motor while the rotor is still oscillating in this jitter phase. For example it could be possible for the motor to be started inadvertently with the rotor spinning in a reverse direction. It would therefore be desirable to first detect whether the motor is in a jitter phase when starting the motor before the start up routine begins. However, detecting this jitter phase is not always possible. For example, if a motor is provided with a rotor position sensor such as a Hall sensor, the extent of the oscillation is typically so small that it will not be detected by the rotor position sensor.

As it isn't possible to detect if the motor is in the jitter phase, when a motor is powered on, often a small time delay is built in before the start up routines are carried out in order to be absolutely sure that the rotor is stationary before the rotor is rotated. This time delay will only be long enough to ensure any oscillation has stopped. However, any delay to starting up the motor is undesirable.

SUMMARY OF THE INVENTION

A first aspect of the present invention provides a method for controlling an electric motor having a rotor, the method being carried out after a shutdown of the motor has been initiated, the method comprising: starting a timer in a motor controller; performing regenerative braking to recapture kinetic energy from the rotor as electrical energy; using the recaptured electrical energy from the regenerative braking to power the motor controller; and if the timer in the motor controller exceeds a predetermined timer value, setting a flag in memory in the motor controller to indicate that the motor has stopped.

As a result when the motor is next turned on, the flag can act as an indication that the motor has completely stopped, and the start up routine can commence immediately without the need for a delay to be carried out before the motor is started.

The recaptured electrical energy may be stored in a capacitor. Accordingly the recaptured energy does not have to be used immediately and can be stored until required.

The capacitor is a DC link capacitor. As a result no additional components are required and the cost of the motor can be kept down.

The method may further comprise comparing the voltage across the capacitor to a maximum voltage threshold value. If the voltage across the capacitor exceeds the maximum threshold value, then the method may further comprise stopping regenerative braking, and initiating freewheel braking. By monitoring the voltage in this way, and ceasing regenerative braking if the voltage gets too high, any damage to the capacitor and other electrical components of the motor can be avoided.

The predetermined timer value may corresponds to a minimum time period required for the rotor to come to a complete stop after the motor shutdown has been initiated. The predetermined timer value may be between 0.5 and 5 seconds, and may be between 1 and 2 seconds. Accordingly the motor controller only needs to be powered for the minimum time possible after the motor has been shutdown. This helps to minimise the amount of energy needed to be recaptured by regenerative braking.

The flag may be set in non-volatile memory within the motor controller, and may be set in electrically erasable programmable read-only memory (EEPROM). Accordingly, the flag will remain set after the motor has shutdown even when the power is removed, and will be available to be ready once the motor has started back up again.

A second aspect of the present invention provides a method for controlling an electric motor, the method being carried out after start up of the motor has been initiated, the method comprising: performing a check for whether a flag has been set in memory in a motor controller, the flag being an indication that the motor has stopped; and if the flag has been set, allowing the motor controller to commence a motor start up routine substantially immediately, or if the flag has not been set, delaying the motor controller from commencing a motor start up routine for a predetermined delay period.

As a result, the time taken for a motor to start up can be minimised because the flag check is much quicker that needing to incorporate a delay in the start up procedure prior to the start up routine being carried out.

If the flag has been set, the method may further comprise clearing the flag.

If no flag has been set, the method may further comprise enabling a braking routine during the predetermined delay period. This braking routine may comprise freewheel braking. This will reduce the amount of time required to delay the commencement of the start up routine.

The predetermined delay period may correspond to a minimum time period required for the rotor to come to a complete stop after the motor has been switched off and may be between 0.5 and 5 seconds, or between 1 and 2 seconds.

The method may be used to start a motor having been shutdown in accordance with the method described in the first aspect of the invention.

A third aspect of the invention provides a regenerative braking method for a permanent magnet electric motor providing a resync signal reflective of an electrical cycle of the motor, the method comprising: measuring a resync period of the resync signal; in a first part of the electrical cycle, using the spinning magnetic field of the rotor to charge a phase inductance; and in a second part of the electrical cycle of the motor, using the charged phase inductance to subsequently charge a capacitor.

As a result, kinetic energy from the spinning rotor can be recaptured and converted into electrical energy as the rotor is slowed down, and the recaptured energy stored in the capacitor for use.

The first part of the electrical cycle may last for a predetermined fraction of the measured resync period and the predetermined fraction may be A of the measured resync period. This allows for an optimised amount of energy to be recaptured from the rotor, while still being able to monitor the speed that the rotor is rotating.

The second part of the electrical cycle may last for a set predetermined value. The set predetermined value may be at least 50% to 75% of a minimum value for the resync period, the minimum value for the resync period being the length of the resync period when the motor is running at its top speed. Accordingly, the regenerative braking method will be able to work over the full speed range of the motor.

The step of using the spinning magnetic field of the rotor to charge a phase inductance may comprise enabling a single switch in an inverter of the motor to allow current to flow through a phase winding.

The step of using the charged phase inductance to subsequently charge a capacitor may comprise disabling all switches in an inverter of the motor and forcing induced current to flow from one side of the capacitor to the other.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Due to cogging torque, the motor enters an oscillation (jitter) phase just before stopping. There is no signal from the rotor position sensor during this oscillation, so the software is unable to tell if the motor is oscillating or not. However, after the rotor position sensor signal is lost, the jitter phase will typically last for a defined period, referred to herein as the settling period. The settling period will be different for each motor and will depend on a number of factors, for example the rotor magnet strength, size of air gap etc. For example, a motor may have a settling period of around 0.6 seconds.

To avoid the need to incorporate a delay period onto the start up procedure, it is desirable to check while the motor is powering down if the motor has been stationary for at least the settling period. However, this may not always be possible if the power to the motor and the motor controller has been switched off, as is typically the case. Accordingly, a method will now be described which incorporates a regenerative braking stage during the motor shutdown procedure which charges a capacitor. The power in the capacitor can then be used to power a timer in the motor controller that runs to ensure the settling period has completed.

Figure 1:
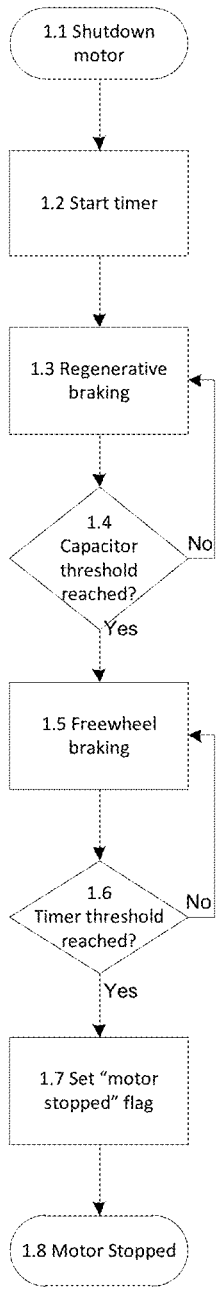
FIG. 1 is flow diagram outlining the steps of a motor shutdown procedure according to examples of the disclosure.

FIG. 1 is a flow diagram which outlines the steps carried out in one embodiment of a motor shutdown procedure:

A motor shutdown procedure is started. This may be, for example, in response to a user turning off it off, or automatic shutdown following a fault detection.

A timer is started. This timer is used to determine the length of time that has passed from the point at which the motor was switched off. A timer threshold can be set for the motor. This threshold can be set such that if the threshold is reached, it can be determined that a time period of at least the settling period will have passed since the motor shutdown commenced.

A regenerative braking stage is commenced. This stage has two major purposes: firstly that it has a braking effect on the motor and therefore acts to slow the motor down more quickly once it has been turned off; and secondly, it recaptures kinetic energy from the motor and stores it in a capacitor as electrical energy which can be used to continue running the timer during this period after shutdown.

A check is done to see if a capacitor threshold has been reached. It will be understood that attempting to drive too much power into a capacitor could damage the capacitor or other electrical components of the motor. The threshold could, for example, be a measurement of voltage across the capacitor. If the threshold has not yet been reached, then the procedure returns to step 1.3 regenerative braking continues. However, once the threshold has been reached then the procedure proceeds on to step 1.5.

The motor is still spinning, but no more energy is needed to charge the capacitor. However, the motor still needs to be stopped, and so a freewheel braking stage is commenced. Freewheel braking is known, and so will not be described in great detail here.

A check to see if the timer threshold described above has been reached. If the timer threshold has not been reached then the freewheeling braking of step 1.5 is continued. If the threshold is reached, then it proceeds to step 1.7.

A "motor stopped" flag is set. This flag is a non-volatile flag and can be stored, for example, in EEPROM (electrically erasable programmable read-only memory).

The motor has stopped.

A further step may be included in the method above which checks the speed of the motor. If the rotor is spinning slowly prior to the regenerative braking step being carried out, then it may be desirable to know that. In this instance a reduced timer threshold may be adopted as it will be known that the rotor will take a shorter period of time to stop compared to if it was starting from a high initial speed. This will reduce the chances of the controller running out of power before a flag can be set due to lower levels of energy recapture at low starting rotor speeds.

Figure 2:
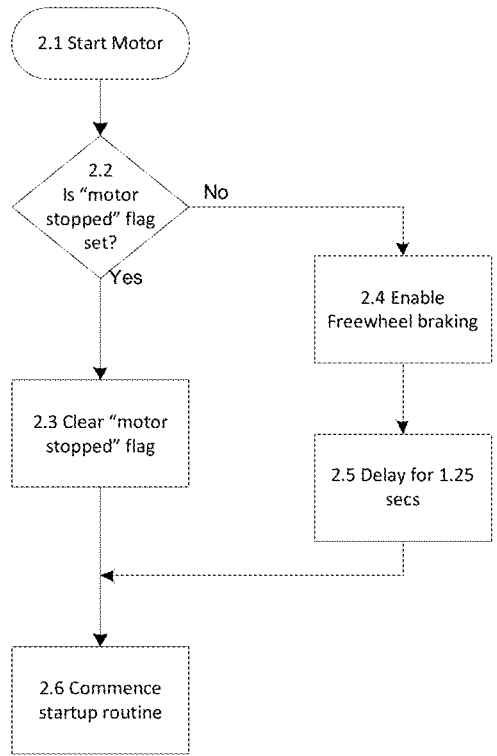
FIG. 2 is flow diagram outlining the steps of a motor start up procedure according to examples of the disclosure.

The non-volatile "motor stopped" flag allows a check to be made when the motor is next started up as to whether or not a delay is required prior to the normal motor start up routine being carried out. FIG. 2 is a flow diagram which outlines the steps carried out in one embodiment of the initial stages of a motor start up routine:

The motor is started. This could be, for example, in response to a user turning it on.

A check to see if the "motor stopped" flag has been set is carried out. If the flag as been set, then there is certainly that the motor has completely stopped and it is safe to restart the motor immediately. The routine therefore proceeds to step 2.3. If no "motor stopped" flag has been set then there is no certainty that the motor has come to a complete stop, and there is a chance that the motor is still in a jitter phase. Therefore the routine proceeds instead to step 2.4.

After identifying that the "motor stopped" flag has been set in step 2.2, the flag can be cleared, and the process proceeds directly to step 2.6 in which the typical start up routine for the motor is carried out.

After identifying that no "motor stopped" flag has been set in step 2.2, the motor enables freewheel braking. If the motor is still moving, then freewheel braking will encourage it to come to a stop faster.

Once freewheel braking has been enabled, a delay of a predetermined period of time, which in this case is 1.25 seconds, is carried out before the process finally proceeds to step 2.6.

The typical motor start up routine is commenced.

The example predetermined delay period of 1.25 seconds described above is calculated such that it corresponds to a minimum time period required for the rotor to come to a complete stop after the motor has been switched off. It will be appreciated that this value will vary from motor to motor. In most cases for motors contained in handheld appliances, for example, this predetermined delay period is expected to be between 0.5 and 5 seconds.

Figure 3:
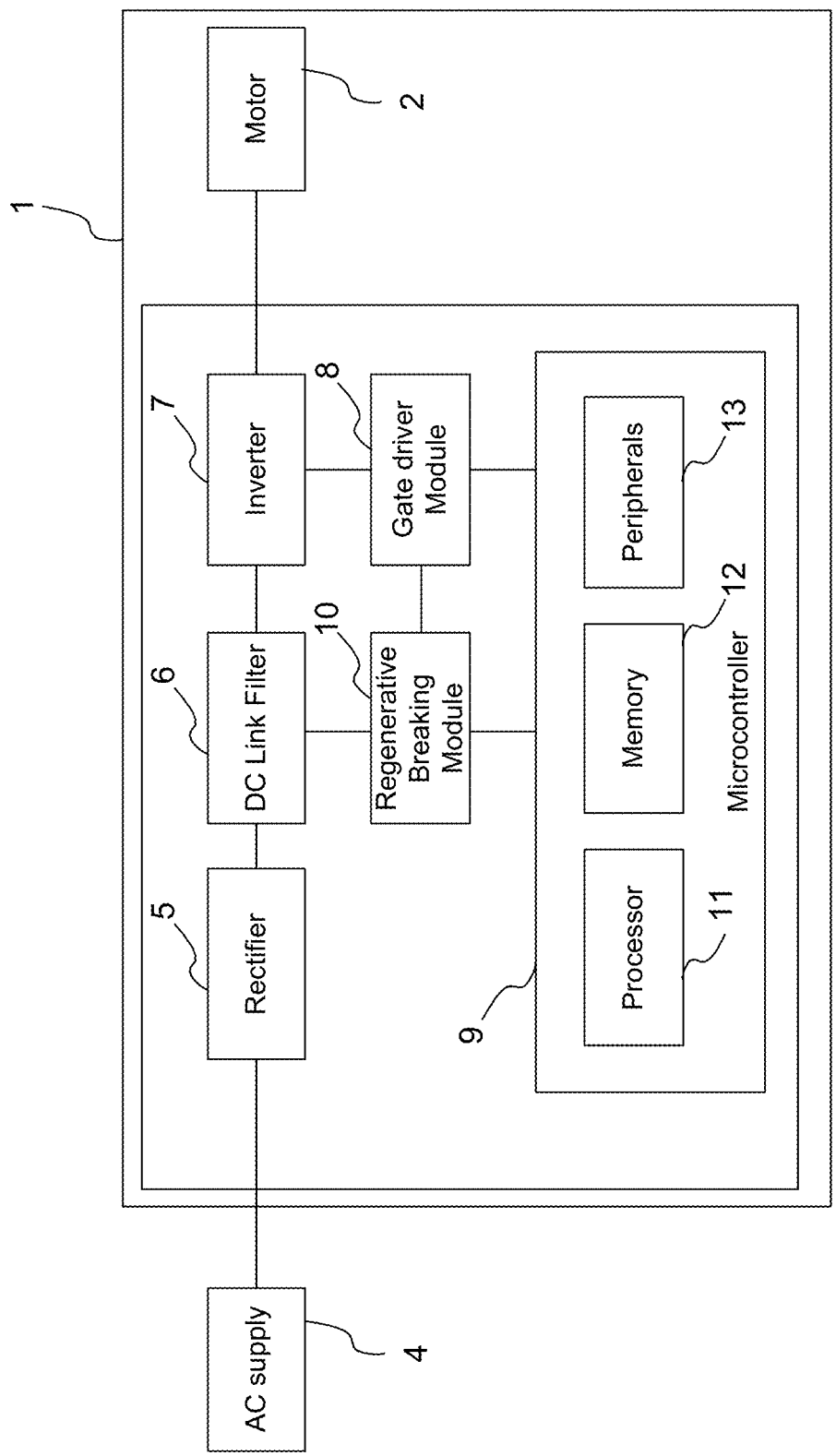
FIG. 3 shows a schematic illustration of a motor system according to examples of the disclosure.

FIG. 3 shows a schematic illustration of a motor system 1 comprising a motor 2 and a microcontroller 3 for controlling the motor 2. Power to the motor system 1 is provided by an AC power supply 4. The AC power supply 4 is intended to be a domestic mains supply.

The motor 2 is a permanent magnet brushless motor, and comprises at least one phase winding. The control system 3 comprises a rectifier 5, a DC link filter 6, an inverter 7, a gate driver module 8, a microcontroller 9 and a regenerative braking module 10.

Figure 4:
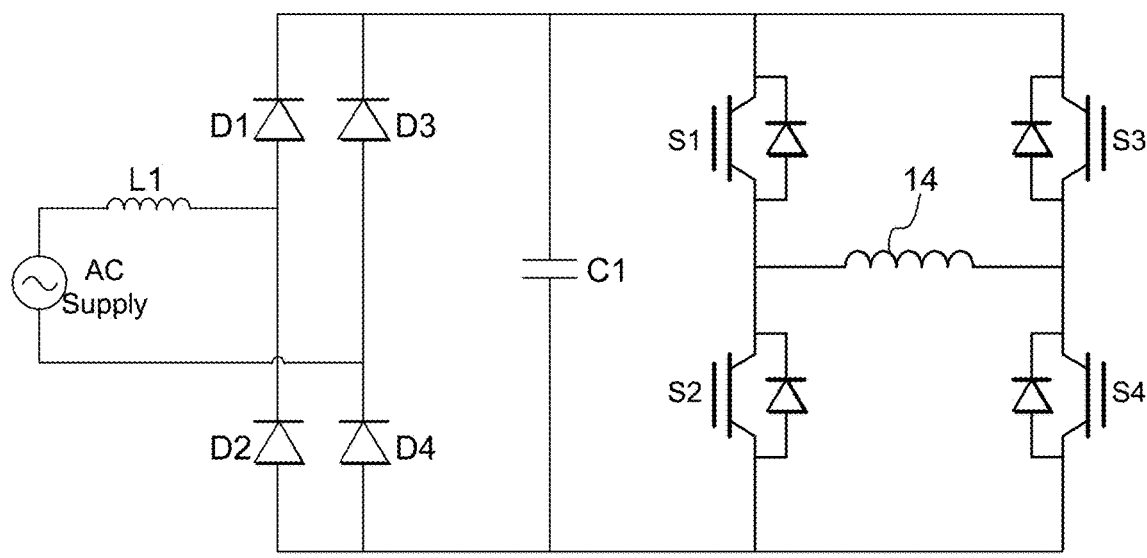
FIG. 4 is a circuit diagram showing components of the motor system of FIG. 3 according to examples of the disclosure.

FIG. 4 is a simplified circuit diagram which shows many of the components of the motor system 1. The rectifier 5 comprises four diodes D1-D4 arranged in a full-wave bridge arrangement that rectifies the output of the AC supply 4 to provide a DC voltage.

The DC link filter 6 comprises a link capacitor C1 and a link inductor L1. The link capacitor C1 acts to smooth the relatively high-frequency ripple that arises from inverter switching. As described below in more detail, the link capacitor C1 is not required to smooth the rectified DC voltage at the fundamental frequency. Consequently, a link capacitor of relatively low capacitance may be used. The link inductor L1 acts to smooth any residual current ripple that arises from inverter switching. Again, since the link inductor L1 is intended to reduce ripple at the switching frequency of the inverter 10, an inductor of relatively low inductance may be used.

The inverter 7 comprises a full bridge of four power switches S1-S4 that couple the DC link voltage to the phase winding 14. Each power switch S1-S4 is an IGBT, which is capable of operating at the voltage level typically of most mains power supplies. Other types of power switch, such as BJTs or MOSFETs, might alternatively be used depending on the rating of the power switch and the voltage of the AC supply 4. Each of the switches S1-S4 includes a flyback diode, which protects the switch against voltage spikes that arise during inverter switching.

The gate driver module 8 drives the opening and closing of the switches S1-S4 of the inverter 7 in response to control signals received from the microcontroller 9.

The microcontroller 9 comprises a processor 11, a memory device 12, and a plurality of peripherals 13 (e.g. ADC, comparators, timers etc.). The memory device 12 stores software instructions for execution by the processor 11. The memory device 12 can also comprise an EEPROM memory area where flags, such as the "motor stopped" flag described in the methods of FIGS. 1 and 2, can be set and cleared.

With regard to the control schemes for the motor 2, the start up, acceleration and steady speed modes may be typical of those for a brushless permanent magnet motor, and in any case fall outside the scope of the present invention, so will not be described in any great detail here.

The regenerative braking module 10 is shown as separate to the microcontroller 9 for the purpose of FIG. 3, but it will be appreciated that it may form part of the microcontroller 9, in particular as separate software instructions stored in memory device 12 and executed by the processor 11 to implement regenerative braking as described in Step 1.3 of FIG. 1. Regenerative braking, and how it is carried out will now be described with reference to FIGS. 5 to 8.

Figure 5:
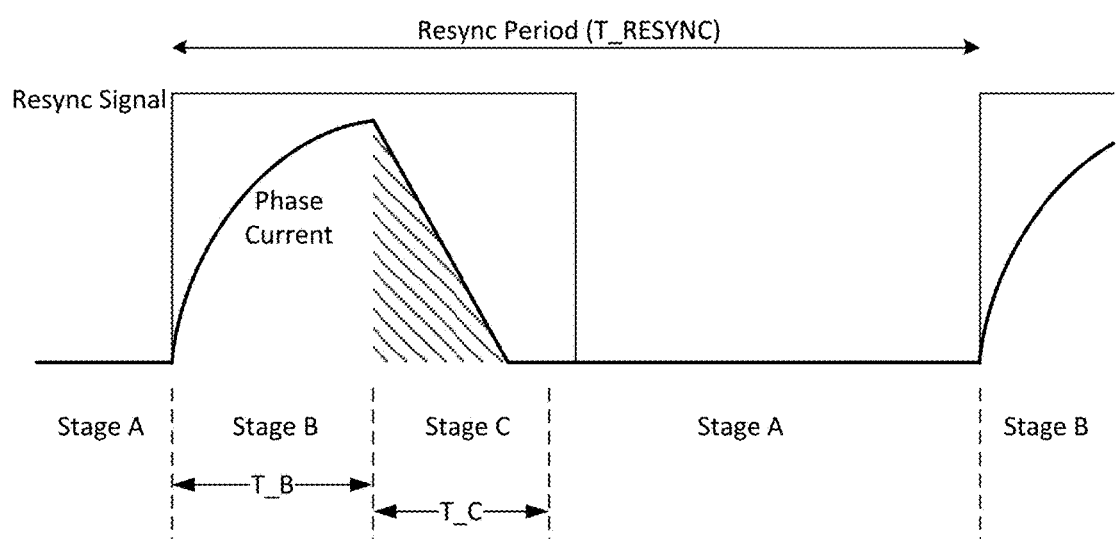
FIG. 5 shows a waveform during regenerative braking according to examples of the disclosure.

Regenerative braking is carried out after the power to the motor has been turned off. FIG. 5 illustrates a waveform of the motor system during the regenerative braking mode. A resync signal, which provides an indication of rotor position, is provided to the regenerative braking module 10 and/or control system 3. In some embodiments, this resync signal may be detected using a rotor position sensor, for example a Hall sensor. The resync period is therefore indicative of the electrical period of the motor, and a full resync cycle is equivalent to a full electrical cycle. Alternatively, the resync signal may generated in software using a sensorless scheme, for example such as that described in GB2501370. The resync signal has a resync period, T_RESYNC, which is used to work out timings involved during regenerative braking which will be explained below.

The waveform of FIG. 5 is split into stages A to C which are repeated. In Stage A all switches S1-S4 are OFF and there is no phase current in the phase winding 14 while the microcontroller 9 waits for a rising edge in the resync signal. Once the rising edge in the resync signal is detected, Stage B is started.

Figure 6:
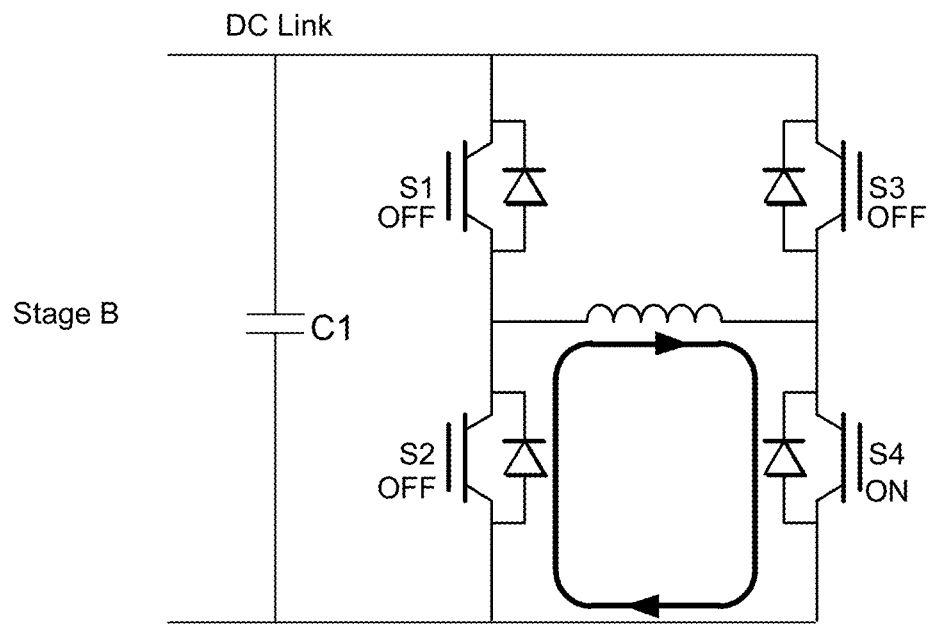
FIGS. 6 and 7 show parts of the circuit diagram of FIG. 4 during different stages of the regenerative braking of FIG. 5 according to examples of the disclosure.

In Stage B, switch S4 is enabled (turned ON), and because the rotor is still spinning, a phase current is generated in the phase winding which acts as an inductor. FIG. 6 shows part of the circuit diagram of FIG. 4, and what is happening during Stage B of the regenerative braking waveform. Here, the current being generated in the phase winding is able to flow through switch S4 (which is set to ON), and also through the flyback diode at switch S2. The phase current therefore cycles around the bottom half of the inverter 7, as indicated by the arrow B. Accordingly, during Stage B it can be said that phase inductance is charged, and the kinetic energy of the rotor is converted to magnetic energy in the form of the magnetic field generated by the induced phase current. In addition, this induced magnetic field helps to slow the rotor as it acts against the magnetic field of the permanent magnet of the rotor. Stage B lasts for a predetermined proportion of the resync period. Depending on the motor's requirements, and the levels of energy needed to be re-captured during regenerative braking, the proportional length of Stage B can be adjusted. However, a period of A of the resync period has been found to be particularly efficient and beneficial, i.e:

$$T\_B = \frac{T\_RESYNC}{4}$$

Figure 7:
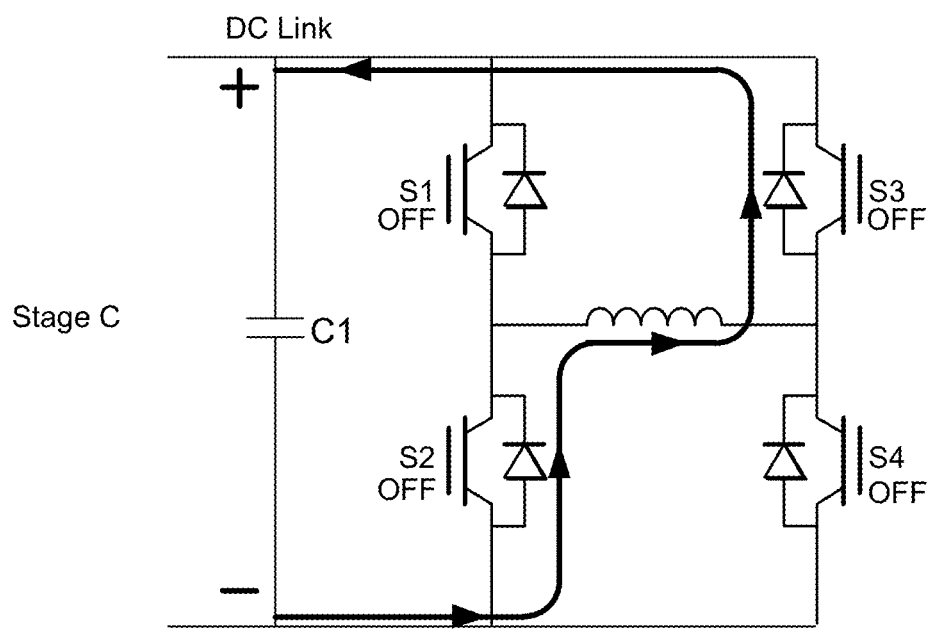

Once Stage B has ended, the switch S4 is disabled (switched OFF), and the magnetic energy stored in the induced magnetic field is converted into electrical energy which acts to charge the DC link capacitor C1. FIG. 7 shows the change to the circuit of FIG. 6 that is brought about in Stage C. Now, with S4 switched OFF, the energy stored in the magnetic field of the phase inductance is converted into electrical energy as the magnetic field collapses. The induced current, which is no longer able to pass through S4, passes through the diodes of both S2 and S3 as shown by Arrow C in FIG. 7, and charges the DC Link capacitor.

The cross-hatched area under the phase current waveform in FIG. 5 represents the power attained by regenerative braking. Once Stage C has completed, Stage A is repeated and the system waits for the next rising edge in the resync signal to be detected.

Stage C lasts for a predetermined period of time, T_C. The length of T_C is a compromise. It needs to be long enough to allow the phase current to return to zero, but also short enough that, at even the highest rotor speed, it does not cross the next rising edge in the resync signal. This is particularly important in sensorless systems in which no Hall sensor is used to determine rotor position. If T_C is too long in a sensorless system, then there is a chance that the next rising edge of the resync signal could be missed, and the control scheme would fail. In one specific embodiment of a motor having a top speed of 120 krpm, and where T_B=¼ T_RESYNC, the period T_C is set at 150 μs ($1.5 \times 10^{-4}$ seconds). The shortest possible resync period, T_RESYNC_MIN, is when the motor is spinning at its top speed. In the specific embodiment previously described, T_RESYNC_MIN is 250 μs when the motor is spinning at the top speed of 120 krpm, and therefore T_B+T_C would be 212.5 μs at top speed, which is less than T_RESYNC_MIN. Therefore the software would still be able to detect the next rising edge in the resync signal even at the highest rotor speed. It will be appreciated that the length of T_C will depend on a number of factors, including the top speed of the motor, and also the desired length of T_B. However, preferably the length of T_C is between (½×T_RESYNC_MIN) and (¾× T_RESYNC_MIN).

As the rotor slows, the length of T_B will obviously change as T_RESYNC changes. To simplify the scheme, and to keep the memory and power requirements of the system down, the method above proposes to have a fixed length of T_C. However, in an alternative embodiment, it may be desirable to also change the value of T_C as the rotor slows to account for the longer T_RESYNC period. For example, values of T_C for different T_RESYNC values may be kept in a lookup table and employed.

Figure 8:
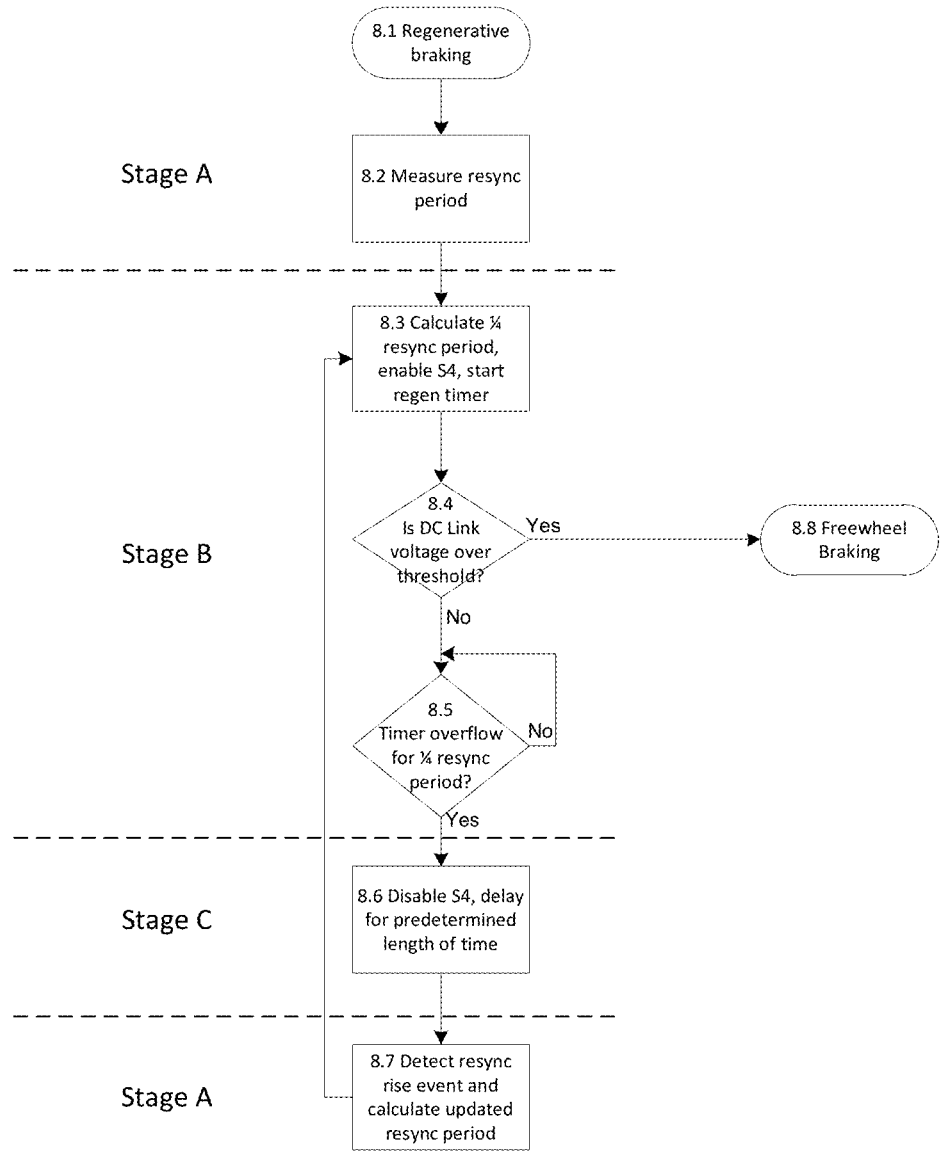
FIG. 8 is a flow diagram outlining the steps of a regenerative braking mode according to examples of the disclosure.

FIG. 8 is a flow diagram which outlines the steps carried out during the regenerative braking mode of step 1.3 in FIG. 1. The flow diagram also shows how the step correlate to the Stages A to C as described above.

The motor enters regenerative braking mode, for example as Step 1.3 of the flow diagram of FIG. 1.

The resync period is measured. This is carried out by measuring a timer between two resync rise events in the resync signal.

From the previously determined resync period, calculate T_B. In the examples explored above this would be a quarter of the resync period just measured. Switch S4 is enabled, and the phase current starts to rise as shown in the waveform of FIG. 5. A timer, referred to here as the regen timer, is started. The regen timer is used to measure the lengths of the Stages B and C described above, i.e. T_B and T_C. A single regen timer is described here which measures both periods, but separate timers may be used to measure T_B and T_C.

A check is made to ensure that the DC Link voltage isn't over a set threshold. As discussed earlier, the DC link capacitor C1 can be damaged if it is over-charged. The threshold therefore acts to protect the capacitor and other electrical components. If the DC link voltage is over the threshold, then the process proceeds directly to step 8.8. If the DC link voltage is under the threshold, then the process proceeds to step 8.5.

Once it is established that the DC link voltage is under the threshold value, a check is then made to see if the regen timer started in step 8.3 has overflowed the T_B period which was calculated in step 8.3. If the timer has not yet overflowed the T_B period, then the process repeats step 8.5 until the timer does overflow. When this happens, the process proceeds to step 8.6.

This step corresponds to Stage C. The switch S4 is disabled, and the energy stored within the magnetic field is converted to electrical energy which is then stored in the DC link capacitor. Once the switch S4 has been turned OFF, there is then a delay for a predetermined period of time (i.e. T_C). This delay may be measured by the regen timer. After the predetermined period of time (T_C) has passed, Stage C has completed, and the process moves to step 8.7.

This stage represents a repeat of Stage A. The system waits for the detection of the next rising edge event in the resync signal. Once this has been detected, an updated resync period can be calculated, and then the process cycles back to step 8.3. The rotor slows over time, and so it is important that the resync period is updated regularly to ensure that the length of T_B is appropriate for the length of the current resync period, T_RESYNC.

Freewheel braking mode is enabled and takes over from regenerative braking.

Freewheel braking is known, and so will not be explained in great detail herein. However, to summarise, freewheel braking comprises enabling both S2 and S4 (S2 and S4 are switched ON). In this way, current induced in the phase winding freewheels around the bottom half of the inverter, and in response, an electromotive force is generated which acts to oppose the rotation of the rotor, thus slowing it down. The switches S2 and S4 remain switched ON during the whole freewheel braking period.

The methods for carrying out the regenerative braking described above involve the turning ON of switch S4 during stage B, and then turning it off during stage C. However, an alternative would be to use switch S2 instead of S4. In this alternative, the direction of the flow of current through the phase winding would be reversed. In this alternative, in Stage C the current would flow through the diodes in switches S4 and S1 instead of S2 and S3 as shown in FIG. 7.

Figure 9:
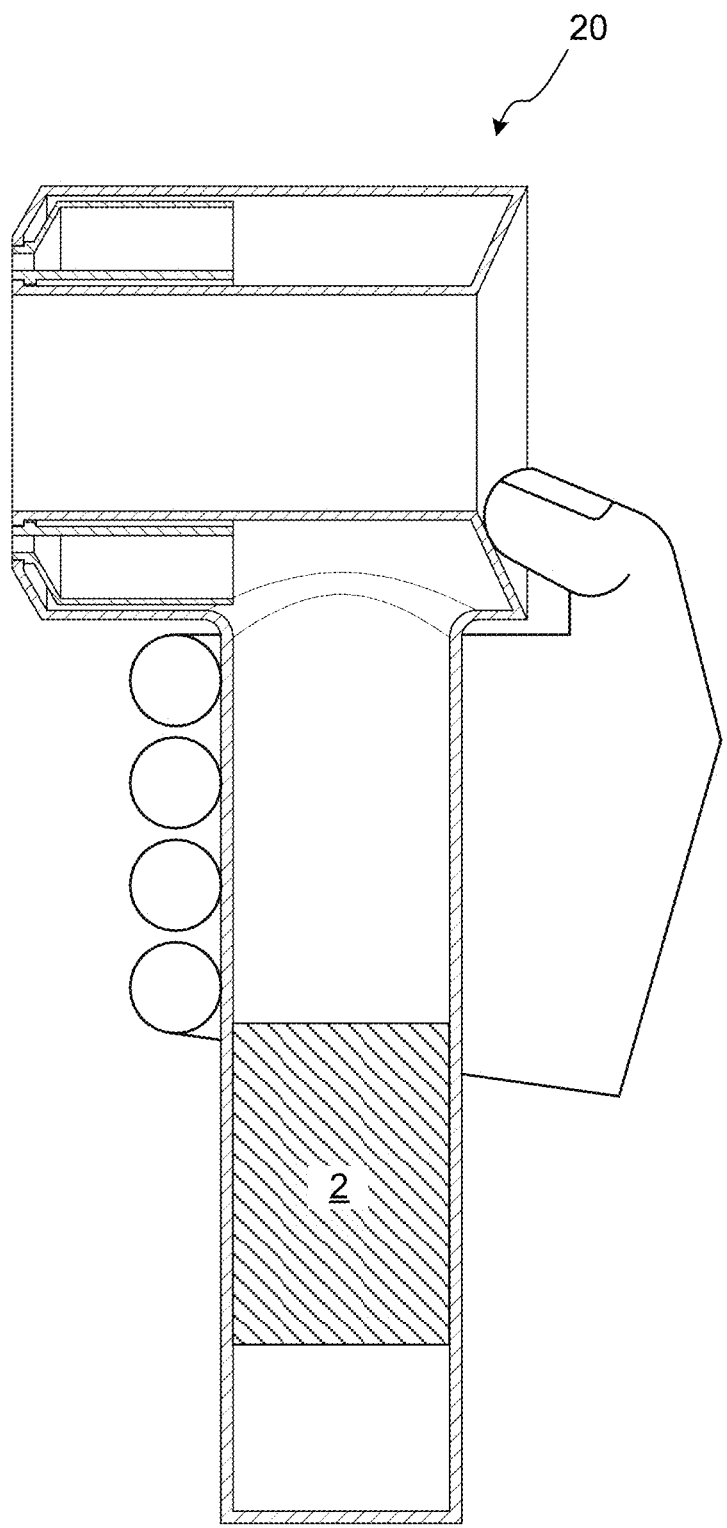
FIG. 9 shows a handheld appliance comprising a motor according to examples of the disclosure.

It will be appreciated that the schemes for motor shut-down, motor start up, and regenerative braking described herein may be applicable for any motor. However, they can be particularly advantageous when used in the control scheme for motors in consumer products, where any delay to the start-up of a product when switching it on could be perceived to a consumer as an inconvenience, or an indication that the product could be faulty. FIG. 9 shows an example of a handheld appliance 20 comprising the motor 2. The handheld appliance 20 shown in FIG. 9 is a hair dryer, however the motor 2 could also be used in other products and appliances, for example other hair care products, vacuum cleaners, fans, hand dryers etc.

Whilst particular embodiments have thus far been described, it will be understood that various modifications may be made without departing from the scope of the invention as defined by the claims.

For example, in the embodiments described above, regenerative braking charges the DC link capacitor C1. However, in alternative embodiments, a separate capacitor or charge holding device may be used to store the energy recaptured during regenerative braking. However, by using the DC link capacitor, no additional components are required which acts to keep the cost of the motor system down.

The embodiments described above show the motor being powered by an AC power supply. However, one or more of the above motor shutdown, motor start up, and regenerative braking schemes may also be used in the control of a battery powered electric motor. In this instance, a battery powered motor would not have a DC link capacitor to charge, however, a separate capacitor, or other charge holding device may be used instead. Alternatively, the energy recaptured by the regenerative braking scheme may be stored back in the main battery pack used to power the motor during its operation.

The invention claimed is:

1. A method for controlling an electric motor, the method being carried out after start up of the motor has been initiated, the method comprising:
   performing a check for whether a flag has been set in memory in a motor controller, the flag being an indication that the motor has stopped; and
   if the flag has been set, allowing the motor controller to commence a motor start up routine upon determining that the flag has been set, or
   if the flag has not been set, delaying the motor controller from commencing a motor start up routine for a predetermined delay period;
   wherein if no flag has been set, the method further comprises enabling a braking routine during the predetermined delay period.

2. The method for controlling an electric motor of claim 1, wherein, if the flag has been set, the method further comprises clearing the flag.

3. The method for controlling an electric motor of claim 1, wherein the braking routine comprises freewheel braking.

4. The method for controlling an electric motor of claim 1, wherein the predetermined delay period corresponds to a minimum time period required for the rotor to come to a complete stop after the motor has been switched off.

5. The method for controlling an electric motor of claim 1, wherein the predetermined delay period is between 0.5 and 5 seconds.

6. The method for controlling an electric motor of claim 5, wherein the predetermined delay period is between 1 and 2 seconds.

7. The method for controlling an electric motor of claim 1, wherein the method is used to start a motor having been shutdown by a method comprising:
   starting a timer in a motor controller;
   performing regenerative braking to recapture kinetic energy from the rotor as electrical energy;
   using the recaptured electrical energy from the regenerative braking to power the motor controller; and
   if the timer in the motor controller exceeds a predetermined timer value, setting a flag in memory in the motor controller to indicate that the motor has stopped.

* * * * *